United States Patent
Hayashi (10) Patent No.: US 9,424,750 B2
(45) Date of Patent: Aug. 23, 2016

(54) VEHICLE CONTROL SYSTEM, SPECIFIC OBJECT DETERMINATION DEVICE, SPECIFIC OBJECT DETERMINATION METHOD, AND NON-TRANSITORY STORAGE MEDIUM STORING SPECIFIC OBJECT DETERMINATION PROGRAM

(71) Applicant: Hideaki Hayashi, Toyota (JP)

(72) Inventor: Hideaki Hayashi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/682,650

(22) Filed: Apr. 9, 2015

(65) Prior Publication Data

US 2015/0247922 A1 Sep. 3, 2015

Related U.S. Application Data (62) Division of application No. 14/361,042, filed as application No. PCT/IB2012/002477 on Nov. 26, 2012, now Pat. No. 9,129,531.

(30) Foreign Application Priority Data

Nov. 28, 2011 (JP) .................. 2011-259524

(51) Int. Cl.
| | | |
|---|---|---|
| G06F 17/10 | (2006.01) | |
| G08G 1/16 | (2006.01) | |
| G01S 13/93 | (2006.01) | |
| G01S 7/02 | (2006.01) | |
| G01S 13/06 | (2006.01) | |

(52) U.S. Cl.
CPC ... *G08G 1/16* (2013.01); *G01S 7/02* (2013.01); *G01S 13/06* (2013.01); *G01S 13/931* (2013.01); *G01S 2013/9342* (2013.01); *G01S 2013/9346* (2013.01); *G01S 2013/9353* (2013.01); *G01S 2013/9375* (2013.01)

(58) Field of Classification Search
CPC ......... G08G 1/16; G08G 1/161; G08G 1/163; G08G 1/168; G08G 1/166; B60Q 1/00; B60R 16/037; B60R 16/0373; B60R 25/1004; B60W 40/09; B60W 50/08; B60W 40/06; B60W 40/10; B60W 2550/402; B60W 30/143; G05D 1/0027; G05D 1/0212; G05D 1/0255; G05D 1/0257; G01S 13/931; G01S 2013/9342
USPC .......... 701/400–541, 300–301; 340/903, 436, 340/3.41
See application file for complete search history.

(56) References Cited

U.S. PATENT DOCUMENTS

| | | | |
|---|---|---|---|
| 2002/0032515 A1* | 3/2002 | Nakamura | B60K 31/0008 701/96 |
| 2008/0042894 A1* | 2/2008 | Kikuchi | B60W 10/184 342/71 |

(Continued)

FOREIGN PATENT DOCUMENTS

| | | |
|---|---|---|
| JP | 2010-091485 A | 4/2010 |
| JP | 2010-261897 A | 11/2010 |
| JP | 2011-051572 A | 3/2011 |

(Continued)

OTHER PUBLICATIONS

Communication dated May 6, 2015 from the U.S. Patent and Trademark Office in counterpart U.S. Appl. No. 14/361,042.

*Primary Examiner* — Muhammad Shafi
(74) *Attorney, Agent, or Firm* — Sughrue Mion, PLLC (57) ABSTRACT

A vehicle control system includes: an anti-collision safety control unit executing anti-collision safety control for avoiding or alleviating a collision with an object including a reflection point on the basis of positional information about the reflection point, output from a positional information output unit; and a cancellation unit calculating an index value that increases with a duration of a state where a variation in a position of the reflection point in a direction perpendicular to a vehicle travelling direction is smaller than a predetermined amount and that, when the index value exceeds a threshold, issues a command such that the anti-collision safety control unit does not execute anti-collision safety control over the reflection point. When it is determined that the vehicle is travelling near a curve entrance, the cancellation unit increases the threshold as compared with when it is determined that the vehicle is not travelling near a curve entrance.

1 Claim, 7 Drawing Sheets

(56) References Cited

U.S. PATENT DOCUMENTS

| | | | |
|---|---|---|---|
| 2009/0265071 A1* | 10/2009 | Isaji | B60W 30/16 701/70 |
| 2010/0283663 A1 | 11/2010 | Sasabuchi et al. | |
| 2012/0176267 A1 | 7/2012 | Nanami | |
| 2013/0038484 A1 | 2/2013 | Ohkado et al. | |

FOREIGN PATENT DOCUMENTS

| | | |
|---|---|---|
| JP | 2011-122876 A | 6/2011 |
| WO | 2011/036803 A1 | 3/2011 |

* cited by examiner

VEHICLE CONTROL SYSTEM, SPECIFIC OBJECT DETERMINATION DEVICE, SPECIFIC OBJECT DETERMINATION METHOD, AND NON-TRANSITORY STORAGE MEDIUM STORING SPECIFIC OBJECT DETERMINATION PROGRAM

This is a Divisional Application of U.S. application Ser. No. 14/361,042 filed May 28, 2014, which is a National Stage of International Application No. PCT/IB2012/002477, filed Nov. 26, 2012, which claims priority to Japanese Patent Application No. 2011-259524, filed Nov. 28, 2011, the contents of all of which are incorporated herein by reference in their entirety.

BACKGROUND OF THE INVENTION

1. Field of the Invention

The invention relates to a vehicle control system that executes anti-collision safety control on the basis of an output from an in-vehicle radar device, and a specific object determination device, a specific object determination method and a non-transitory storage medium that stores a specific object determination program, which are used in the vehicle control system.

2. Description of Related Art

There has been practically used a technique for anti-collision safety control through which a positional relationship between a vehicle and an obstacle is recognized on the basis of an output from a radar device mounted on the vehicle and then brake control is automatically executed or an airbag is controlled in advance when there is a likelihood of a collision. With such a technique, by improving the accuracy of recognizing an obstacle, it is possible to further appropriately execute anti-collision safety control. For example, if it is possible to accurately recognize a low-level metal object (that a vehicle is able to run over), such as a joint of a bridge, a steel plate for construction and a lid (grating) of a ditch, it is possible to automatically limit brake control and, as a result, to further appropriately execute anti-collision safety control.

Japanese Patent Application Publication No. 2010-261897 (JP 2010-261897 A) describes a vehicle object detecting device that calculates the width of an object on the basis of a position of a reflection point of an electromagnetic wave, that further sets a position of a representative point of the object on the basis of positions of a plurality of the reflection points and that calculates a relative velocity in a host vehicle width direction (lateral relative velocity) of the object on the basis of a variation in the position of the reflection point or representative point. In the vehicle object detecting device, when it is determined that the object is a stationary object and the amount of increase in the width of the object is larger than a predetermined value on the basis of the detection history of the object detected at predetermined intervals, a lateral relative velocity calculated by lateral relative velocity calculation means is corrected, thus improving the accuracy of the lateral relative velocity.

In addition, Japanese Patent Application Publication No. 2011-051572 (JP 2011-051572 A) describes a vehicle control system that is used to avoid a collision with an obstacle when no operation of a steering wheel has been detected. The vehicle control system determines whether a road on which a vehicle is travelling is a curve having a bank with an inclination angle larger than or equal to a predetermined angle in a vehicle width direction and, when the vehicle control system determines that the vehicle is travelling on a curve having a bank, sets the threshold of a time to contact to suppress or prohibit control for avoiding a collision with the obstacle.

However, the device described in JP 2010-261897 A just corrects a lateral relative velocity as a result of recognition of a stationary object and may not be able to appropriately determine whether it is a situation in which anti-collision safety control needs to be executed.

In addition, the system described in JP 2011-051572 A just executes anti-collision safety control when no operation of the steering wheel has been detected, so a condition for suppressing anti-collision safety control is limited to a curve having a bank, that is, a situation in which the vehicle is able to turn without steering operation. Therefore, the system is not applicable to other various travelling environments.

SUMMARY OF THE INVENTION

The invention provides a vehicle control system, specific object determination device, specific object determination method and storage medium storing a specific object determination program, which are able to execute appropriate anti-collision safety control on the basis of the property of an object detected by a radar and a travelling environment of a vehicle.

A first aspect of the invention provides a vehicle control system. The vehicle control system includes: a radar unit that irradiates an electromagnetic wave to an area around a vehicle and that outputs information about a received reflected wave; a positional information output unit that outputs positional information about a reflection point on the basis of the information about the reflected wave, output from the radar unit; an anti-collision safety control unit that executes anti-collision safety control for avoiding or alleviating a collision with an object that includes the reflection point on the basis of the positional information about the reflection point, output from the positional information output unit; a cancellation unit that calculates an index value that increases with a duration of a state where a variation in a position of the reflection point in a direction perpendicular to a travelling direction of the vehicle is smaller than a predetermined amount and, when the index value exceeds a threshold, issues a command to the anti-collision safety control unit such that the anti-collision safety control unit does not execute anti-collision safety control over the object that includes the reflection point; and a travel route determination unit that determines whether the vehicle is travelling near an entrance of a curve, wherein when the travel route determination unit determines that the vehicle is travelling near an entrance of a curve, the cancellation unit increases the threshold as compared with when the travel route determination unit determines that the vehicle is not travelling near an entrance of a curve.

According to the first aspect of the invention, it is possible to execute appropriate anti-collision safety control on the basis of the property of an object detected by a radar and a travelling environment of the vehicle.

In the first aspect of the invention, the vehicle control system may further include a singular point determination unit that generates an intensity distribution of the reflected wave from the reflection point on the basis of the information about the reflected wave, output from the radar unit, and that determines whether there is a statistic singular point, wherein the cancellation unit may calculate the index value such that the index value increases with the duration of the state where a variation in the position of the reflection point in the direction perpendicular to the travelling direction of the vehicle is smaller than the predetermined amount when the determination unit determines that there is no statistic singular point in the intensity distribution of the reflected wave from the reflection point and the index value reduces when the determination unit determines that there is the statistic singular point in the intensity distribution of the reflected wave from the reflection point.

In the first aspect of the invention, the anti-collision safety control unit may execute a plurality of anti-collision safety controls, and the cancellation unit may use the threshold that is compatible with the plurality of anti-collision safety controls.

A second aspect of the invention provides a specific object determination device. The specific object determination device includes: a radar unit that irradiates an electromagnetic wave to an area around a vehicle and that outputs information about a received reflected wave; a positional information output unit that outputs positional information about a reflection point on the basis of the information about the reflected wave, output from the radar unit; an index value calculation unit that generates an intensity distribution of the reflected wave from the reflection point on the basis of the information about the reflected wave, output from the radar unit, and that calculates an index value, which indicates a probability that the reflection point is included in a specific object, such that the index value increases with a duration of a state where a variation in a position of the reflection point in a direction perpendicular to a travelling direction of the vehicle is smaller than a predetermined amount and there is no statistic singular point in the intensity distribution and the index value reduces when there is the statistic singular point in the intensity distribution of the reflected wave from the reflection point; and a determination unit determines that the reflection point is included in the specific object when the index value exceeds a threshold.

According to the second aspect of the invention, it is possible to accurately determine the property of an object detected by a radar.

A third aspect of the invention provides a specific object determination method that determines whether a reflection point is included in a specific object by irradiating an electromagnetic wave to an area around a vehicle and then analyzing information about a received reflected wave with the use of a computer. The specific object determination method includes: determining whether there is a statistic singular point in an intensity distribution of the reflected wave from the reflection point; calculating an index value, which indicates a probability that the reflection point is included in the specific object, such that the index value increases with a duration of a state where a variation in a position of the reflection point in a direction perpendicular to a travelling direction of the vehicle is smaller than a predetermined amount when there is no statistic singular point in the intensity distribution of the reflected wave from the reflection point and the index value reduces when there is the statistic singular point in the intensity distribution of the reflected wave from the reflection point; and, when the index value exceeds a threshold, determining that the reflection point is included in the specific object.

A fourth aspect of the invention provides a non-transitory storage medium that stores a specific object determination program for irradiating an electromagnetic wave to an area around a vehicle and then causing a computer to analyze information about a received reflected wave and determine whether a reflection point is included in a specific object. The specific object determination program includes: determining whether there is a statistic singular point in an intensity distribution of the reflected wave from the reflection point; calculating an index value, which indicates a probability that the reflection point is included in the specific object, such that the index value increases with a duration of a state where a variation in a position of the reflection point in a direction perpendicular to a travelling direction of the vehicle is smaller than a predetermined amount when there is no statistic singular point in the intensity distribution of the reflected wave from the reflection point and the index value reduces when there is the statistic singular point in the intensity distribution of the reflected wave from the reflection point; and, when the index value exceeds a threshold, determining that the reflection point is included in the specific object.

According to the third and fourth aspects of the invention, it is possible to determine whether an object detected by a radar is the specific object.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

A vehicle control system according to the embodiment of the invention will be described with reference to the drawing.

Figure 1:
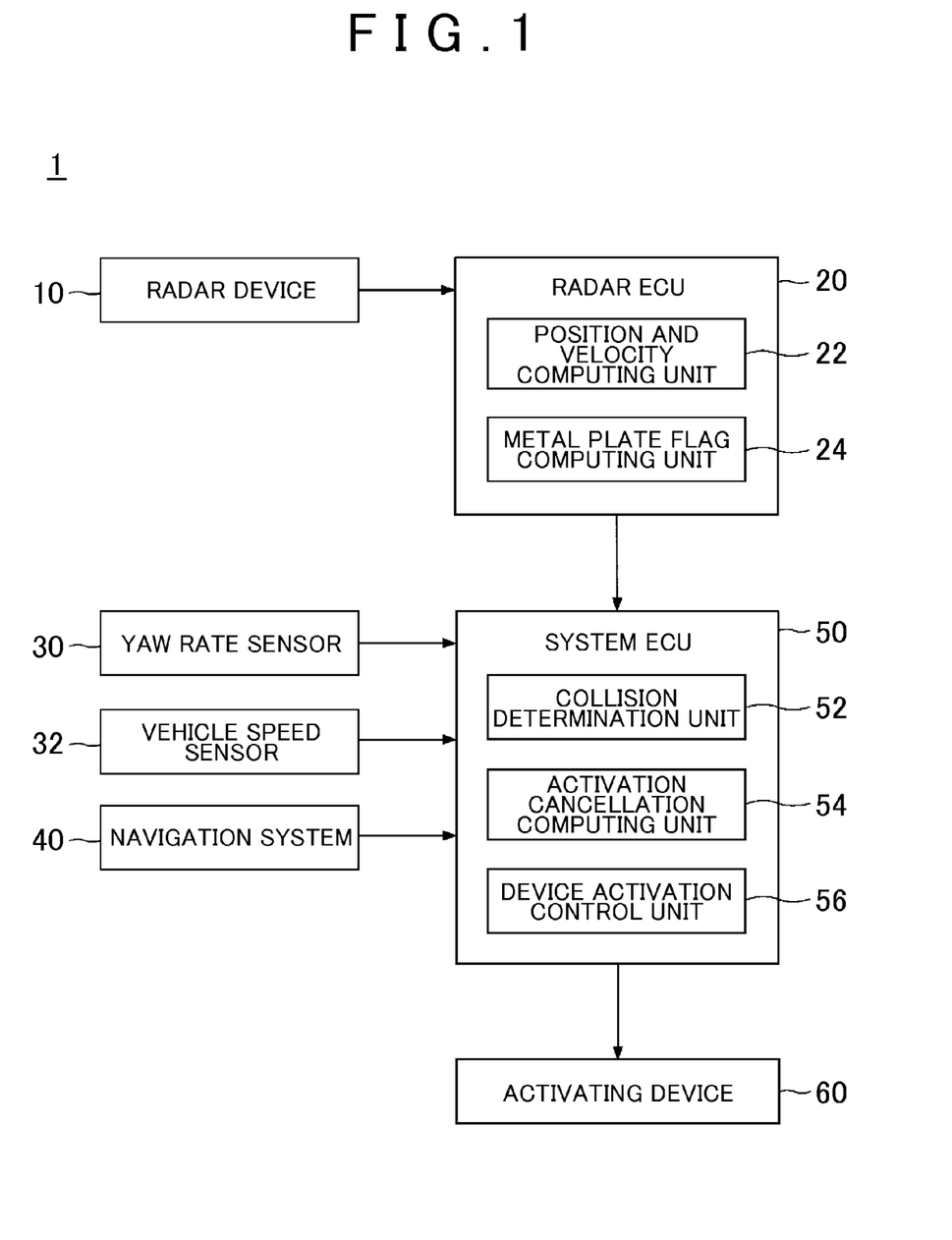
FIG. 1 is an example of the system configuration of a vehicle control system according to an embodiment of the invention.

FIG. 1 is an example of the system configuration of the vehicle control system 1 according to the embodiment of the invention. The vehicle control system 1 includes a radar device 10, a radar electronic control unit (ECU) 20, a yaw rate sensor 30, a vehicle speed sensor 32, a navigation system 40, a system ECU 50 and an activating device 60 as major components.

The radar device 10 is, for example, a millimeter-wave radar. The radar device 10 is mounted at the front of a host vehicle on which the vehicle control system 1 is mounted, and detects an obstacle present ahead of the host vehicle. The radar device 10 functions as a radar unit. The radar device 10 includes a transmission antenna, a signal generating unit, a receiving antenna, and the like. The transmission antenna irradiates an electromagnetic wave forward of the vehicle. The signal generating unit generates a transmission signal to be supplied to the transmission antenna. The receiving antenna receives a reflected wave that is the electromagnetic wave reflected from an obstacle. The transmission antenna may be integrated with the receiving antenna. In terms of application purposes of the invention, any system may be employed as the system of the radar device 10, and, for example, a frequency-modulated continuous-wave (FM-CW) system is employed.

The FM-CW system is a system in which a transmission signal of which the frequency gradually increases and decreases is mixed with a received signal to generate a beat signal, the frequency of the beat signal (beat frequency) is identified for each of sections of an increasing portion at which the frequency of the transmission signal increases and a decreasing portion at which the frequency decreases, and a distance to a measured object (obstacle) and a direction and a relative velocity of the measured object are measured by applying digital beam forming (DBF), or the like, on the basis of the beat frequency of the increasing portion and the beat frequency of the decreasing portion.

The radar ECU 20 is, for example, a microcomputer in which a central processing unit (CPU) and a memory device, such as a read only memory (ROM) and a random access memory (RAM), are connected to each other via a bus. The radar ECU 20 further includes an auxiliary storage device, I/O ports, a timer, a counter, and the like. The auxiliary storage device is, for example, a hard disk drive (HDD), a digital versatile disk-recordable (DVD-R) drive, a compact disc-recordable (CD-R) drive and an electronically erasable and programmable read only memory (EEPROM). Programs to be executed by the CPU and data are stored in the auxiliary storage device.

The radar ECU 20 includes a position and velocity computing unit 22 and a metal plate flag computing unit 24 as functional blocks that function as the CPU executes the programs. The position and velocity computing unit 22 performs various computations in the above-described FM-CW system and then calculates a position (distance and direction) of each reflection point of an obstacle, from which an electromagnetic wave is reflected, and a relative velocity with respect to the host vehicle. The metal plate flag computing unit changes on/off states of a metal plate flag on the basis of the intensity distribution of a reflected wave for each reflection point. The position and velocity computing unit 22 functions as a positional information output unit.

Here, the metal plate flag is a flag that indicates that the obstacle is highly likely a low-level metal object on a road that the vehicle is able to run over, such as a joint of a bridge, a steel plate for construction and a lid (grating) of a ditch, which is intrinsically desired not to be set as a target of anti-collision safety control, and is set by writing a value indicating an on state or an off state to a predetermined area of the RAM, or the like.

Figures 2A, 2B:
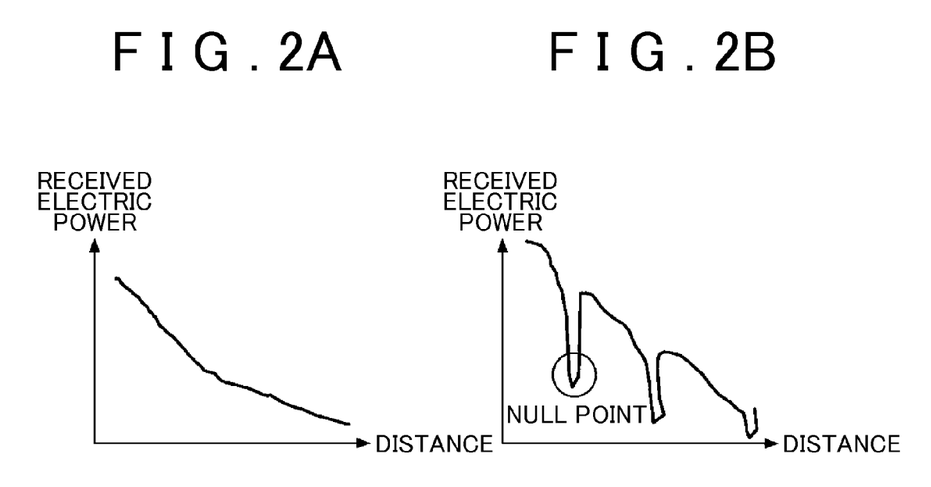
FIG. 2A is a histogram that shows the intensity distribution of a reflected wave from the same reflection point of a metal object on a road in an ideal environment.
FIG. 2B is a histogram that shows the intensity distribution of a reflected wave from the same reflection point of another vehicle in an ideal environment.

FIG. 2A is a histogram that shows the intensity distribution of a reflected wave from the same reflection point of a metal object on a road in an ideal environment. FIG. 2B is a histogram that shows the intensity distribution of a reflected wave from the same reflection point of another vehicle in an ideal environment. In FIG. 2A and FIG. 2B, the abscissa axis represents a distance between the host vehicle and the reflection point, and the ordinate axis represents an electric power received by the receiving antenna of the radar device 10. The intensity of a reflected wave is indicated by an electric power received by the receiving antenna of the radar device 10.

Here, the "same reflection point" means a series of reflection points of which a fluctuation in position falls within a predetermined distance from a previous position while the radar device 10 repeatedly receives a reflected wave. Hereinafter, description will be made on the assumption of this definition.

FIG. 2A shows the intensity distribution of a reflected wave from a metal object on a road. FIG. 2B shows the intensity distribution of a reflected wave from another vehicle. In this way, by analyzing the intensity distribution of a reflected wave, showing the correlation between a received electric power and a distance from the same reflection point, it is possible to determine to some extent whether an obstacle is a metal object on a road or another vehicle or another object that becomes a target of anti-collision safety control. The metal plate flag computing unit 24, for example, sets the metal plate flag to the off state when a null point (statistic singular point) shown in FIG. 2B has been detected from the histogram that shows the intensity distribution of a reflected wave, and sets the metal plate flag to the on state when the null point has not been detected from the histogram. More specifically, in the histogram that shows the intensity distribution of a reflected wave, when a variance of reflection intensities or difference between a maximum value and a minimum value of the reflection intensities in a certain infinitesimal distance section is larger than or equal to a predetermined value, it is determined that a null point has been detected; whereas, when a variance of reflection intensities or difference between a maximum value and a minimum value of the reflection intensities in an infinitesimal distance section is smaller than the predetermined value over all the sections of the histogram, it is determined that no null point has been detected. Various other methods are conceivable for statistically detecting a singular point, and it is not limited to the above-described method.

Figure 3:
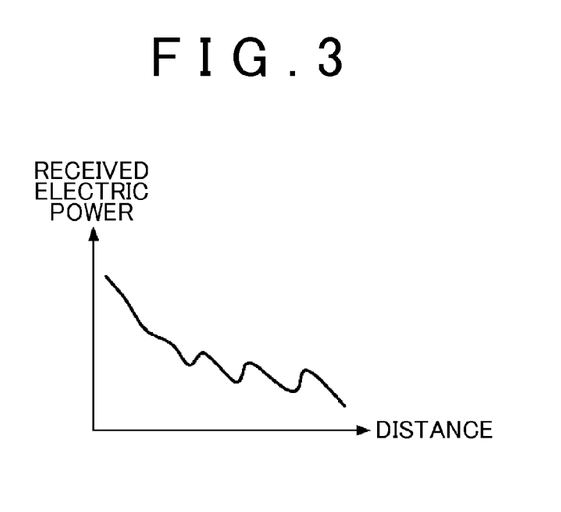
FIG. 3 is a histogram that shows the intensity distribution of a reflected wave from another vehicle in an actual environment.

However, realistically, the intensity distribution of a reflected wave from another vehicle is not the one shown in FIG. 2B, and it may be the one shown in FIG. 3, which cannot be easily determined as the intensity distribution of a reflected wave as shown in FIG. 2A. FIG. 3 is a histogram that shows the intensity distribution of a reflected wave from another vehicle in an actual environment. In the histogram shown in FIG. 3, it is highly likely that no null point has been detected.

Figure 4:
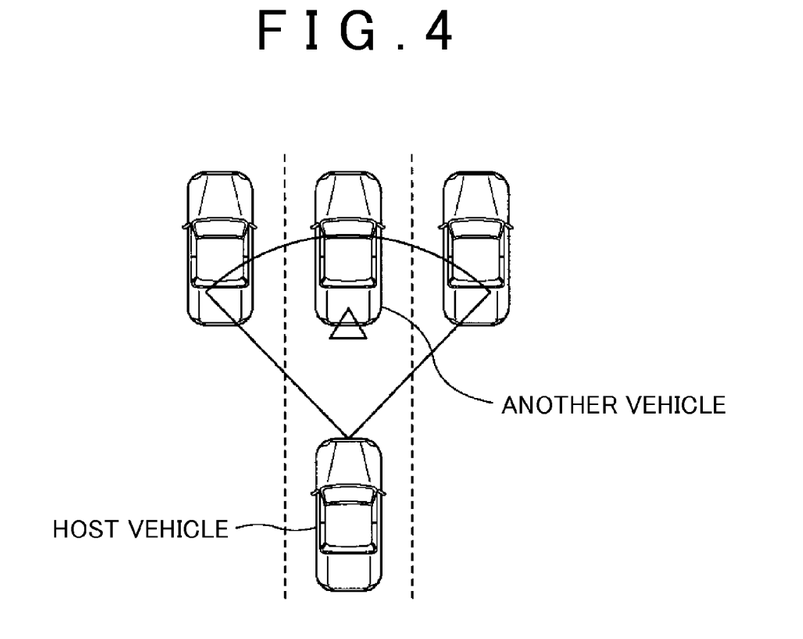
FIG. 4 is a view that illustrates a travelling environment in which the intensity distribution of a reflected wave from another vehicle fluctuates.
Figure 5:
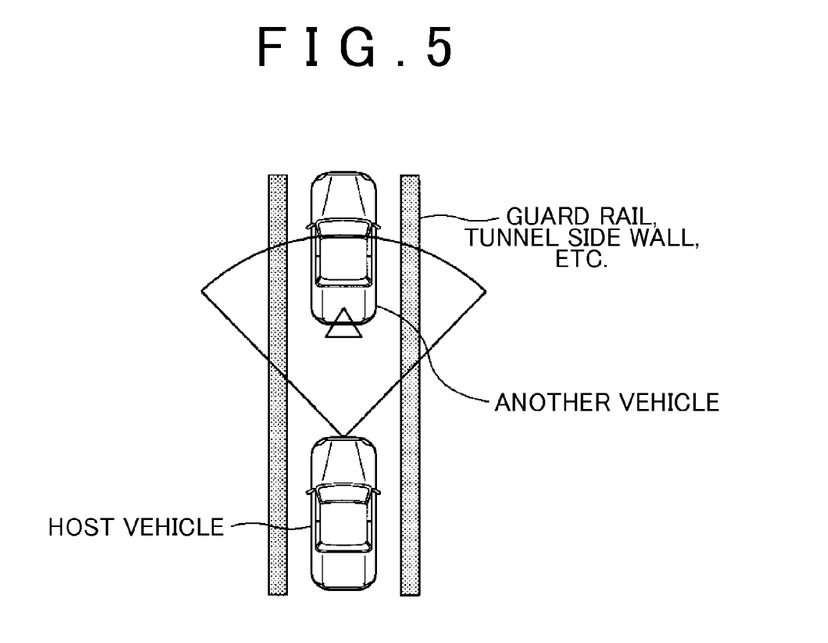
FIG. 5 is a view that illustrates a travelling environment in which the intensity distribution of a reflected wave from another vehicle fluctuates.

Such fluctuations in the intensity distribution of a reflected wave depend on a travelling environment in which the host vehicle is situated. FIG. 4 and FIG. 5 are views that illustrate travelling environments in which the intensity distribution of a reflected wave from another vehicle fluctuates. When further other vehicles are travelling next to another intended vehicle as shown in FIG. 4 or when a guard rail, a side wall of a tunnel, or the like, is present laterally to another vehicle as shown in FIG. 5, the intensity distribution of a reflected wave can be close to the distribution shown in FIG. 2A due to the influence of multipath, or the like.

Thus, in the vehicle control system 1 according to the present embodiment, the type of obstacle is not determined by the metal plate flag only but utilized as one element of determination process (described later).

The radar ECU 20 outputs the position, relative velocity and metal plate flag of an obstacle to the system ECU 50.

The yaw rate sensor 30 detects a rotation angular velocity in the horizontal direction of the vehicle. In addition, the vehicle speed sensor 32, for example, includes wheel speed sensors and a skid control computer. The wheel speed sensors are respectively attached to wheels. The skid control computer calculates a vehicle speed by, for example, obtaining the average of these sensor output values, excluding an abnormal value. These sensor output values are output to the system ECU 50 via a multiplex communication line, another in-vehicle ECU, or the like.

The navigation system 40 includes a GPS receiver, a storage device, and a navigation computer. The storage device, such as an HDD, stores map data. The navigation computer identifies the position (latitude, longitude and altitude) of the host vehicle by analyzing a signal output from the GPS receiver. In the case of the present embodiment, the navigation system 40 outputs a signal that indicates whether the host vehicle is travelling near an entrance of a curve to the system ECU 50. The phrase "near an entrance of a curve" is, for example, defined in advance as a position that falls within the range of, for example, A [m] before to B [m] behind a node that indicates an entrance of a curve section. The navigation system 40 functions as a travel route determination unit.

Note that means for determining whether the vehicle is travelling near an entrance of a curve is not limited to the one with the use of the navigation system 40; it may be determined by analyzing a signal output from the radar device 10 or the yaw rate sensor 30.

The system ECU 50 has a similar hardware configuration to that of the radar ECU 20, and includes a collision determination unit 52, an activation cancellation computing unit 54 and a device activation control unit 56 as functional blocks that function as the CPU executes programs.

The collision determination unit 52 determines whether there is a likelihood of collision with an obstacle by determining whether index values, such as a lateral position (a deviation of the obstacle from the extension of the central axis of the host vehicle), a collision lateral position (an intersection of a front end line of the host vehicle and the trajectory of the obstacle) and a time to collision (TTC), acquired from information about the obstacle (reflection points) output from the radar ECU 20, satisfy a collision determination condition.

The activation cancellation computing unit 54 cancels activation of the activating device 60 as a result of the determination result made by the collision determination unit 52 using the position, relative velocity and metal plate flag of the obstacle, input from the radar ECU 20. The detailed description will be made later. The activation cancellation computing unit 54 functions as a cancellation unit.

The device activation control unit 56 activates the activating device 60 when the collision determination unit 52 determines that there is a likelihood of a collision and the activation cancellation computing unit 54 does not cancel activation of the activating device 60. The device activation control unit 56 functions as an anti-collision safety control unit.

Various devices may be employed as the activating device 60. For example, the activating device 60 may be a speaker that outputs an alarm sound to a driver, an electronically-controlled brake device that outputs braking force independent of a depression amount of a brake pedal, an automatic steering system that outputs steering force independent of steering operation, or the like. In addition, the activating device 60 may be an airbag system, a seatbelt pretensioner, a bonnet activating device, or the like, for protecting a passenger, an outside pedestrian, or the like, in the event of a collision. In addition, a plurality of activating devices may be provided.

Figure 6:
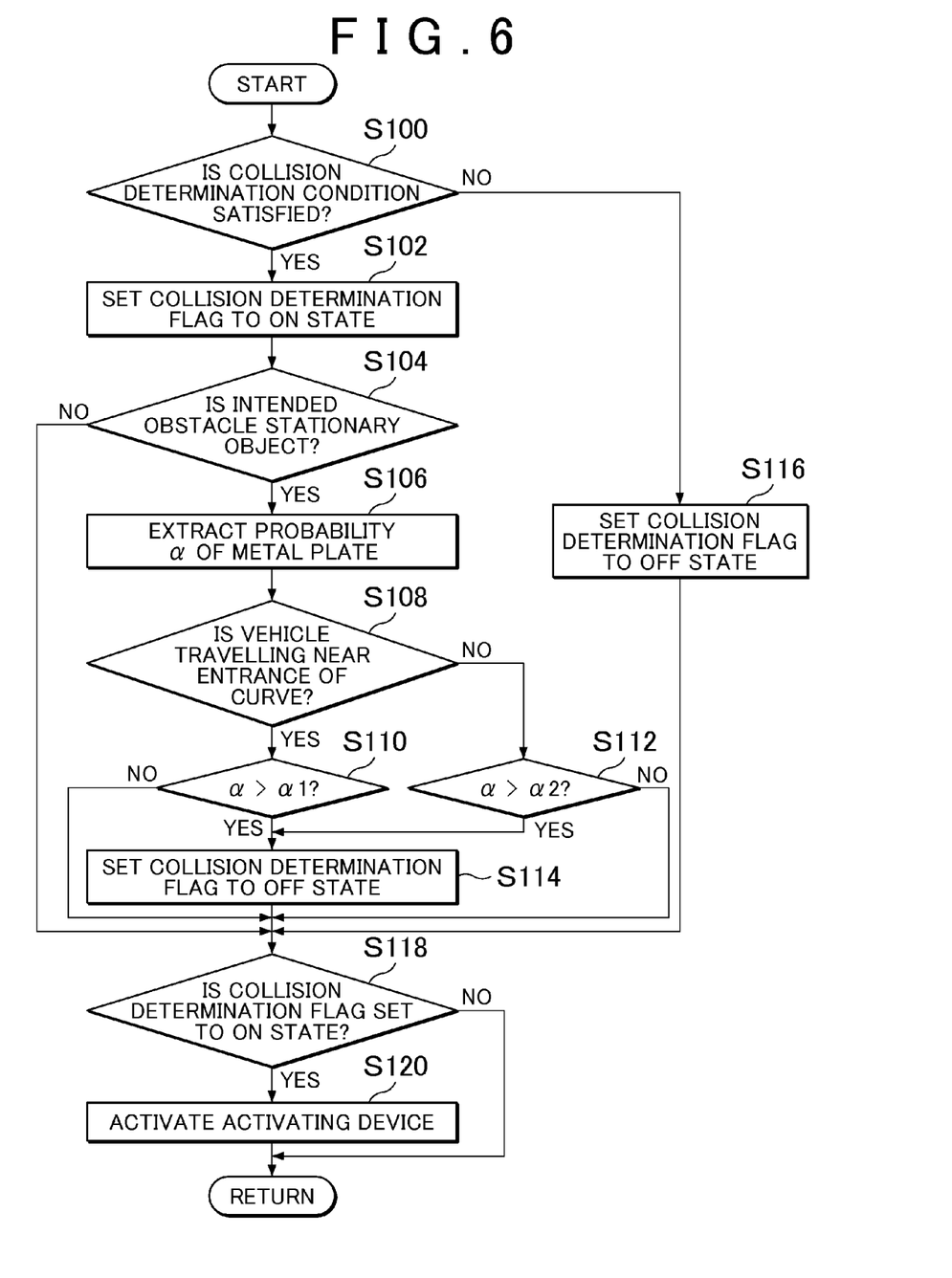
FIG. 6 is a flowchart that shows the flow of processes executed by a system ECU according to the embodiment.

Hereinafter, the flow of processes executed by the system ECU 50 will be described. FIG. 6 is a flowchart that shows the flow of processes executed by the system ECU 50 according to the present embodiment. The routine is executed for each obstacle (each reflection point, and the same applies to the following description).

First, the collision determination unit 52 determines whether the collision determination condition is satisfied for an obstacle (S100). When the collision determination condition is satisfied, the collision determination unit 52 sets a collision determination flag to an on state (S102).

Subsequently, the activation cancellation computing unit 54 determines whether the intended obstacle is a stationary object (S104). Determination in this step is made by, for example, determining whether a change of the absolute position of the obstacle, output from the radar ECU 20, is smaller than a predetermined value. Note that, for an obstacle that has been determined as not a stationary object once, it may be determined as not a stationary object even when the obstacle is stopped thereafter (for example, when a travelling vehicle is stopped).

When the intended obstacle is a stationary object, the activation cancellation computing unit 54 extracts the probability α of metal plate for the obstacle, calculated in advance (S106).

The probability α of metal plate is a value that is repeatedly calculated for each obstacle, in addition to the flow of the routine. The probability α of metal plate is calculated as described below separately in the case where the metal plate flag is in the on state and in the case where the metal plate flag is in the off state.

(1) When the metal plate flag is in the on state and when the lateral positional deviation of the obstacle in a last predetermined period (for example, about several hundreds of milliseconds) is smaller than a predetermined value (for example, smaller than about several tens of centimeters), the probability α of metal plate is increased by a predetermined value (for example, about several percent). Here, the lateral positional deviation is a variation in a direction perpendicular to the travelling direction of the host vehicle.

(2) When the metal plate flag is in the on state and the lateral positional deviation of the obstacle in the last predetermined period is not smaller than the predetermined value, the probability α of metal plate remains unchanged.

(3) When the metal plate flag is in the off state, the probability α of metal plate is reduced by a predetermined value (for example, about several percent).

In this way, the probability α of metal plate is an index value that tends to increase with the duration of a variation of the obstacle in the direction perpendicular to the travelling direction of the host vehicle is smaller than a predetermined amount. When the probability α of metal plate exceeds a threshold, there is a high probability that the obstacle is the above-described metal object on a road. The activation cancellation computing unit 54 functions as both an index value calculation unit and a determination unit.

Figure 7A:
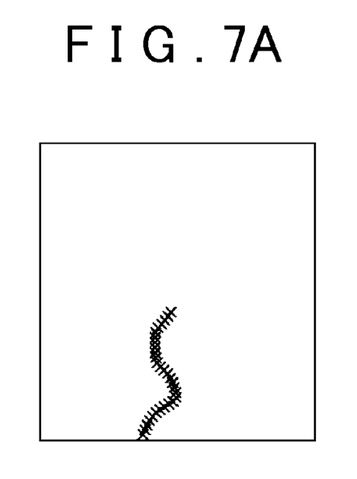
FIG. 7A is a view that shows a change of the position of a reflection point from a vehicle that travels ahead of a host vehicle.
Figure 7B:
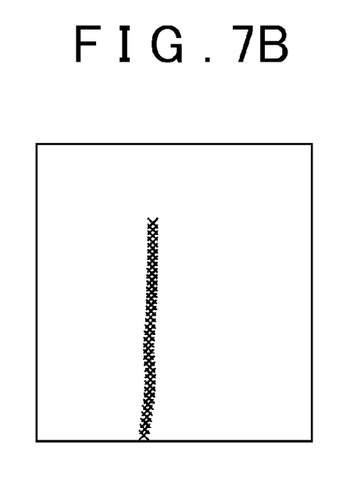
FIG. 7B is a view that shows a change of the position of a reflection point from a metal object on a road.

FIG. 7A is a view that shows a change of the position of a reflection point from a vehicle that travels ahead of the host vehicle. FIG. 7B is a view that shows a change of the position of a reflection point from a metal object on a road. As shown in FIG. 7A, the reflection point from a vehicle that travels ahead of the host vehicle tends to wobble in the width direction of the host vehicle; whereas, as shown in FIG. 7B, the reflection point from a metal object on a road has small fluctuations in the width direction of the host vehicle because an electromagnetic wave is highly likely to be reflected from one point concentratively. Thus, the probability α of metal plate is an effective index value that indicates a probability that an obstacle is a metal object on a road.

Figure 8:
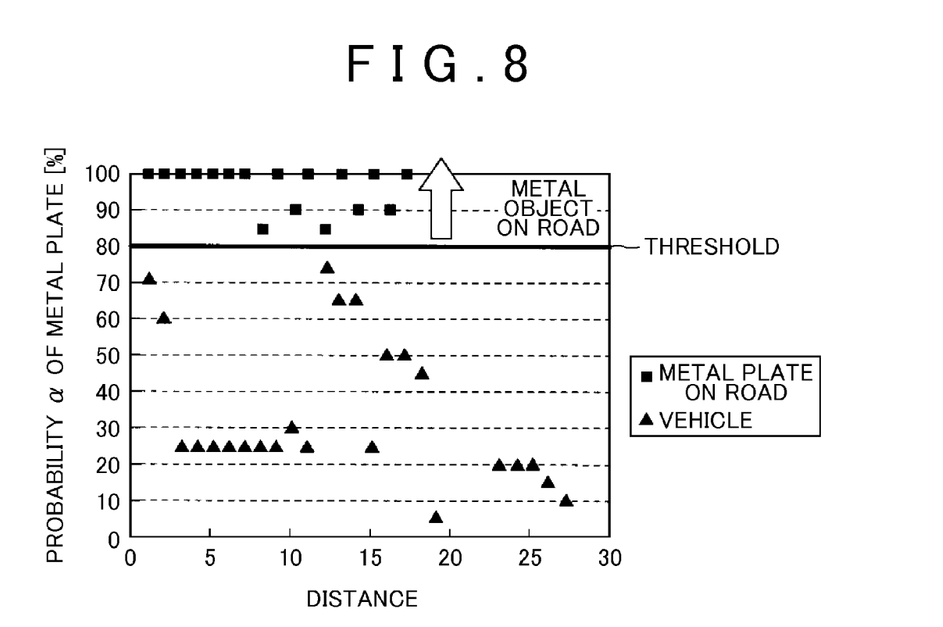
FIG. 8 is a graph that shows the probability of metal plate, calculated by actually activating a radar device toward another vehicle and a metal object on a road.

In addition, FIG. 8 is a graph that shows the probability α of metal plate, calculated by actually activating the radar device toward another vehicle and a metal object on a road. In FIG. 8, the abscissa axis represents a distance to another vehicle or metal object on a road, and the ordinate axis represents the probability α of metal plate. As shown in the graph, the probability α of metal plate is higher than a threshold (80% in the graph) for a metal object on a road, and the probability α of metal plate is lower than the threshold for another vehicle.

Referring back to the flowchart of FIG. 6, the process will be described. When the probability α of metal plate is extracted in S106, the activation cancellation computing unit 54 determines whether the host vehicle is travelling near an entrance of a curve on the basis of the signal input from the navigation system 40 (S108).

When the host vehicle is travelling near an entrance of a curve, it is determined whether the probability α of metal plate exceeds a threshold at (S110). When the probability α of metal plate exceeds the threshold α1, the collision determination flag is changed to the off state (S114).

On the other hand, when the host vehicle is not travelling near an entrance of a curve, it is determined whether the probability α of metal plate exceeds a threshold α2 (S112). When the probability α of metal plate exceeds α2, the collision determination flag is changed to the off state (S114).

Through the processes of S110 to S114, it is possible to suppress activation of the activating device 60 for a metal object on a road, which intrinsically does not require anti-collision safety control.

Here, the relationship that the threshold α1 is larger than the threshold α2 holds (for example, α1=90%, α2=60%, or the like). That is, when the host vehicle is travelling near an entrance of a curve, the activation cancellation computing unit 54 does not change the collision determination flag to the off state even when the probability α of metal plate is high to some extent (between the threshold α1 and the threshold α2).

Figure 9:
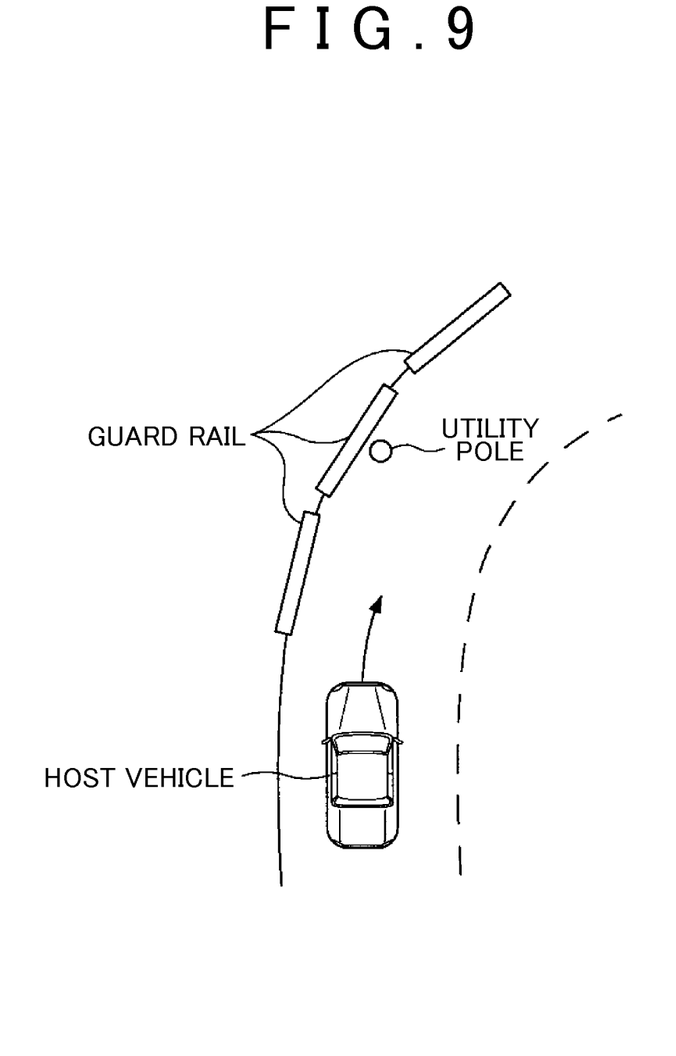
FIG. 9 is a view that shows a travelling situation in which a utility pole is present at a roadside near an entrance of a curve.

As a result, near an entrance of a curve at which the necessity of anti-collision safety control is high, it is possible to further actively activate the activating device 60 for a utility pole, a pole, a guard rail, or the like, present at a roadside. FIG. 9 is a view that shows a travelling situation in which a utility pole is present at a roadside near an entrance of a curve. A utility pole, a pole, a guard rail, and the like, exhibit a similar reflection characteristic to a metal object on a road, so the metal plate flag is highly likely to be set. Thus, it is highly likely that the calculated probability α of metal plate is high. However, these objects do not allow the vehicle to run over, and should be set as objects intended for anti-collision safety control. Then, in the vehicle control system 1 according to the present embodiment, a threshold used in determination made by the activation cancellation computing unit 54 is set to be high near an entrance of a curve, and, by so doing, does not change the collision determination flag to the off state even when the probability α of metal plate is high to some extent. Thus, the vehicle control system 1 according to the present embodiment is able to increase the possibility that the activating device 60 is activated in a situation shown in FIG. 9.

The thresholds α1 and α2 may be separately set in accordance with the type of the activating device 60 (alarm sound output, automatic braking, or the like) or control system.

Note that, when the collision determination condition is not satisfied in S100, the collision determination flag is set to the off state.

When the processes of S100 to S116 have been completed, it is determined whether the collision determination flag is set to the on state (S118).

When the collision determination flag is set to the on state, the device activation control unit 56 activates the activating device 60 (S120).

With the above-described vehicle control system 1 according to the present embodiment, it is possible to execute appropriate anti-collision safety control on the basis of the property of an object (obstacle) detected by the radar device 10 and a travelling environment of the host vehicle.

The embodiment of the invention is described above; however, the invention is not limited to the above-described embodiment. Various modifications and replacements may be added without departing from the scope of the invention.

Figure 10:
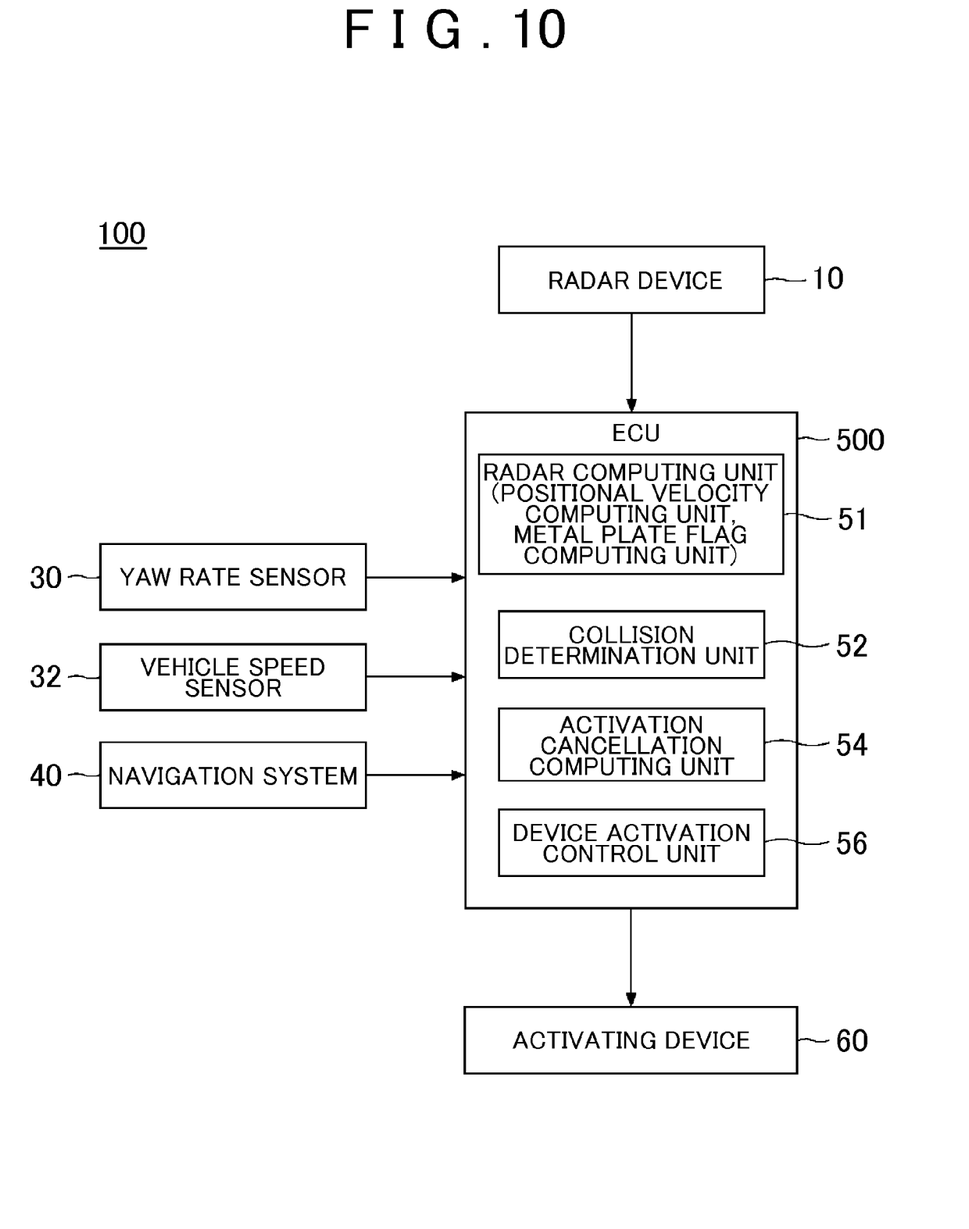
FIG. 10 is an example of the system configuration of a vehicle control system according to an alternative embodiment of the invention.

For example, as shown in FIG. 10, the function of the radar ECU 20 may be one function (a radar computing unit 51 that includes a positional velocity computing unit and a metal plate flag computing unit) of an integrated ECU 500. FIG. 10 is an example of the system configuration of a vehicle control system 100 according to an alternative embodiment of the invention. In this way, for the arrangement of the functional units on the hardware, various modifications are applicable.

The invention claimed is:
1. A specific object determination device comprising:
a radar unit configured to irradiate an electromagnetic wave to an area around a vehicle and output information about a received reflected wave;
a positional information output unit configured to output positional information about a reflection point from an obstacle on the basis of the information about the reflected wave, output from the radar unit;
an index value calculation unit configured to generate an intensity distribution of the reflected wave from the reflection point on the basis of the information about the reflected wave,
a statistic singular point determination unit configured to determine whether there is a statistic singular point in an intensity distribution of the reflected wave from the reflection point;
wherein the index value calculation unit is configured to calculate an index value, which indicates a probability that the reflection point is from a metal plate; and
a determination unit configured to determine that the reflection point is from a metal plate when the index value exceeds a threshold, and
wherein, the index value calculation unit is configured to increase the index value when the statistic singular point determination unit determines there is no statistic singular point and a lateral positional deviation of the obstacle in a last predetermined period is smaller than a predetermined value, and the index calculation unit is configured to reduce the index value when the statistic singular point determination unit determines existence of the statistic singular point.

* * * * *